(12) United States Patent
Akabane et al.

(10) Patent No.: US 9,250,397 B2
(45) Date of Patent: Feb. 2, 2016

(54) OPTICAL CONNECTOR

(71) Applicants: FUJITSU COMPONENT LIMITED, Tokyo (JP); FUJITSU LIMITED, Kawasaki-shi, Kanagawa (JP)

(72) Inventors: Ayumu Akabane, Tokyo (JP); Mariko Kase, Isehara (JP); Osamu Daikuhara, Tokyo (JP)

(73) Assignees: FUJITSU COMPONENT LIMITED, Tokyo (JP); FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/330,264

(22) Filed: Jul. 14, 2014

(65) Prior Publication Data

US 2015/0023635 A1    Jan. 22, 2015

(30) Foreign Application Priority Data

Jul. 18, 2013  (JP) .................................. 2013-149802

(51) Int. Cl.
*G02B 6/36* (2006.01)
*G02B 6/38* (2006.01)

(52) U.S. Cl.
CPC .................................. *G02B 6/3874* (2013.01)

(58) Field of Classification Search
CPC .................................................. G02B 6/3834
See application file for complete search history.

(56) References Cited

U.S. PATENT DOCUMENTS

| 2004/0109646 A1* | 6/2004 | Anderson et al. ................ 385/71 |
| 2010/0054673 A1* | 3/2010 | Koreeda ............... G02B 6/4292 |
|  |  | 385/92 |
| 2013/0028559 A1 | 1/2013 | Shiraishi |
| 2014/0193120 A1* | 7/2014 | Hodge et al. ..................... 385/79 |

FOREIGN PATENT DOCUMENTS

| DE | 3902022 | * | 7/1990 | ............... G02B 6/36 |
| JP | 2013-29782 |  | 2/2013 |  |

* cited by examiner

*Primary Examiner* — Uyen Chau N Le
*Assistant Examiner* — Chad Smith
(74) *Attorney, Agent, or Firm* — Staas & Halsey LLP

(57) ABSTRACT

An optical connector comprising a connector body, an enclosure that is a slit-shaped hole formed from one surface of the connector body into the connector body and accommodates a sheet-like optical waveguide with a tip of the optical waveguide abutting against a bottom of the hole, and a pressing section that is provided on a first surface of the enclosure facing a sheet surface of the enclosed optical waveguide and presses the enclosed optical waveguide toward a second surface of the enclosure facing the first surface so as to bring the enclosed optical waveguide into contact with the second surface.

7 Claims, 6 Drawing Sheets

OPTICAL CONNECTOR

CROSS-REFERENCE TO RELATED APPLICATION(S)

This application is based upon and claims the benefit of priority of the prior Japanese Patent Application No. 2013-149802, filed on Jul. 18, 2013, the entire contents of which are incorporated herein by reference.

FIELD

The embodiment discussed herein is related to an optical connector.

BACKGROUND

Conventionally, optical connectors for connecting an optical fiber having a circular cross section to a sheet-like optical waveguide have been disclosed. Such optical connectors have a first ferrule and a second ferrule that can be connected to each other with their connecting surfaces abutting against each other. Provided on the insertion surface that is on the side opposite to the connecting surface of the first ferrule is a first receptacle into which an optical fiber is inserted. An optical fiber is inserted into the first receptacle, and the optical fiber whose tip is brought into contact with the bottom of the first receptacle is held by the first receptacle. The second ferrule has a slit-shaped second receptacle that is a hollow extending from the insertion surface on the side opposite to the connecting surface into the body of the second ferrule. A sheet-like optical waveguide is inserted into the second receptacle, and the sheet-like optical waveguide whose tip is brought into contact with the bottom of the second receptacle is held by the second receptacle. The width and the height of the second receptacle are approximately the same as the width and the thickness of the optical waveguide, respectively.

The second ferrule may also have a third receptacle on the connecting surface, and a lens provided at the bottom of the third receptacle. While the first ferrule and the second ferrule are connected, light transmitted over the optical waveguide is collected at the lens, and the collected light enters the center of the optical fiber. A related art example is disclosed in Japanese Laid-open Patent Publication No. 2013-29782.

Misalignment among center lines of the optical waveguide, the lens, and the optical fiber reduces the efficiency of collection of light to the center of the optical fiber. For this reason, in the above-described optical connector, the second receptacle and the optical waveguide are designed to have substantially the same shape and size so that inserting the optical waveguide into the second receptacle matches the center lines of the lens and the optical waveguide with each other.

However, difficulty in controlling all of the width, the height, and the depth of the second receptacle with high accuracy leads to production of optical connectors in which the second receptacle is not formed as designed, and can result in reduction in the optical transmission efficiency at the optical connector. Removing the optical connectors that do not meet design requirements reduces a yield rate.

SUMMARY

According to an aspect of an embodiment, an optical connector includes a connector body; an enclosure that is a slit-shaped hole formed from one surface of the connector body into the connector body, and accommodates a sheet-like optical waveguide with a tip of the optical waveguide abutting against a bottom of the hole; and a pressing section that is provided on a first surface of the enclosure facing a sheet surface of the enclosed optical waveguide, and presses the enclosed optical waveguide toward a second surface of the enclosure facing the first surface so as to bring the enclosed optical waveguide into contact with the second surface.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 1:
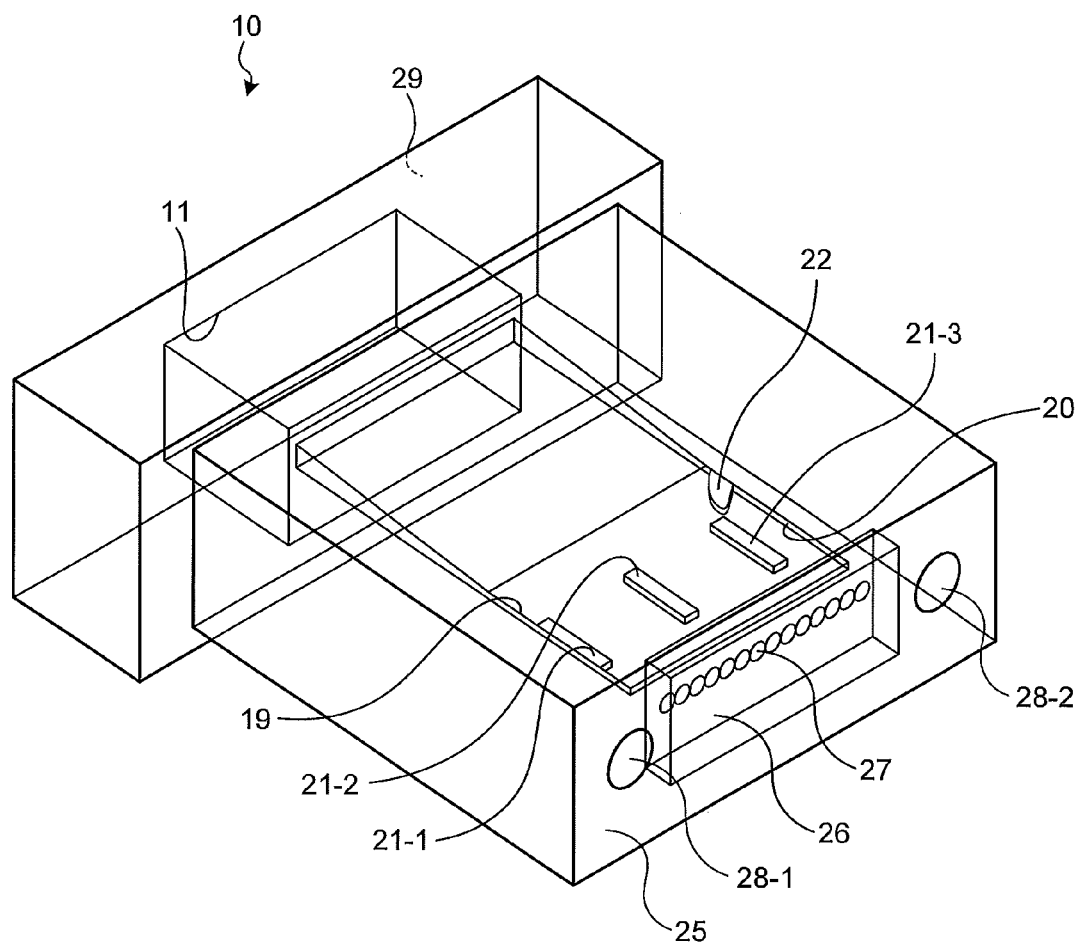
FIG. 1 is a schematic illustrating an example of a connector body in an optical connector according to one embodiment of the present invention.

Embodiments of the present invention will be explained with reference to accompanying drawings. This embodiment is not intended to limit the scope of the optical connector according to the present invention in any way. In the embodiment, elements having the same function are assigned with the same reference numerals, and a redundant explanation thereof is omitted herein.

Exemplary Structure of Optical Connector

Figure 2:
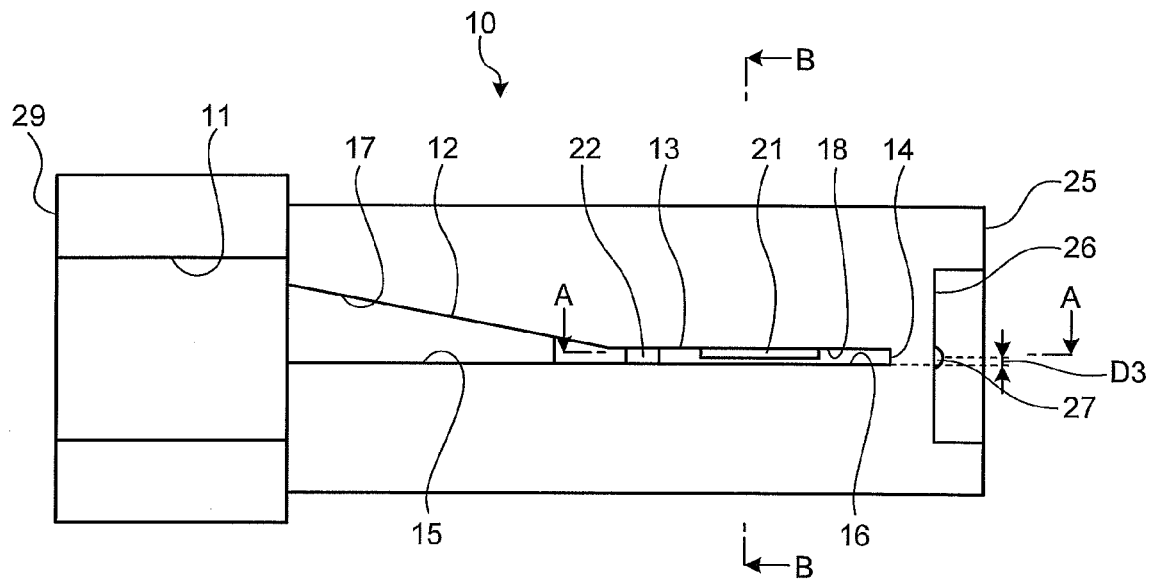
FIG. 2 is another schematic illustrating the example of the connector body in the optical connector according to the embodiment.
Figure 3:
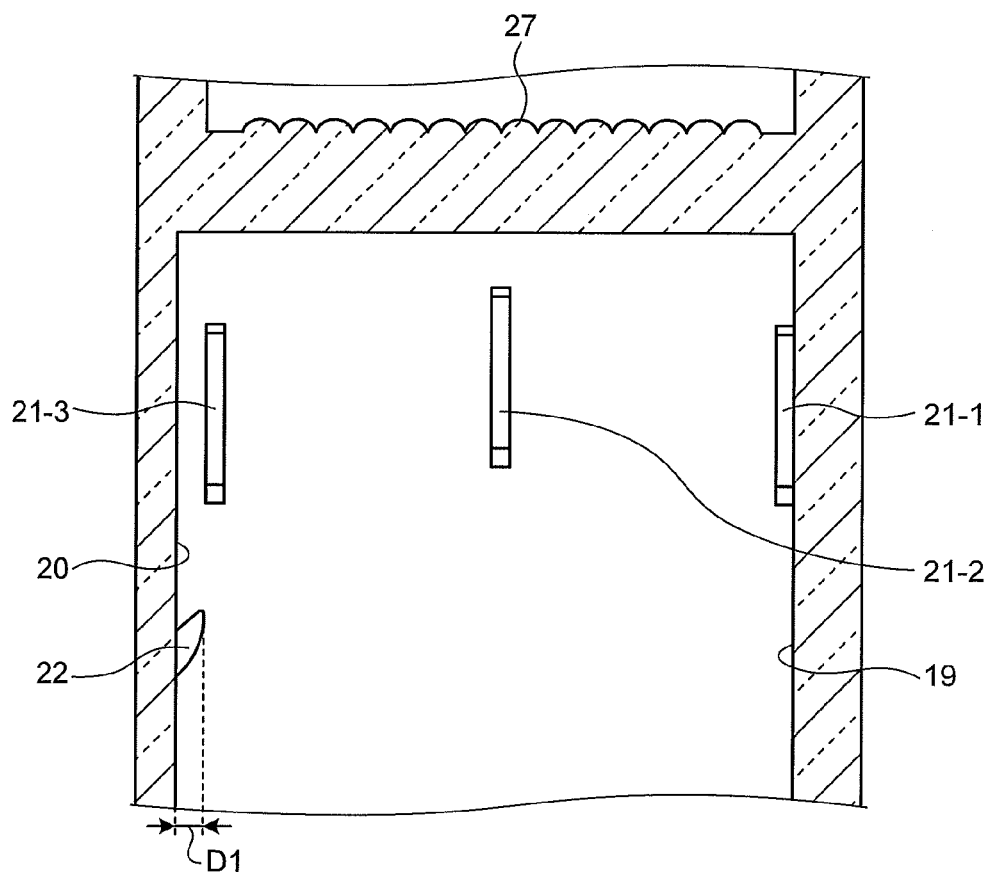
FIG. 3 is a cross-sectional view across the line A-A in FIG. 2.
Figure 4:
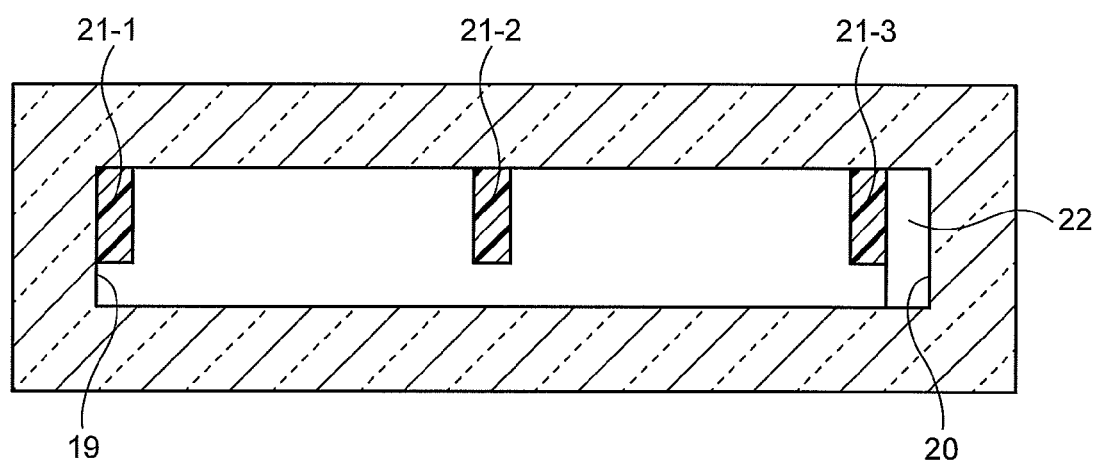
FIG. 4 is a cross-sectional view across the line B-B in FIG. 2.

FIGS. 1 and 2 are schematics illustrating an example of a connector body in an optical connector according to one embodiment of the present invention. Specifically, FIG. 1 is an exemplary perspective view of the connector body. FIG. 2 is a side view in a direction of the optical transmission. FIG. 3 is a cross-sectional view across the line A-A in FIG. 2. FIG. 4 is a cross-sectional view across the line B-B in FIG. 2. The connector body corresponds to the ferrule.

A connector body 10 has a rubber boot slit 11 into which a rubber boot holding an optical waveguide 30 described later is fitted, an insertion slit 12 extending from the rubber boot slit 11, and an optical waveguide slit 13 (an enclosure for the optical waveguide 30) extending further from the insertion slit 12. In the connector body 10, the rubber boot slit 11, the insertion slit 12, and the optical waveguide slit 13 together form a continuous hole extending from a insertion surface 29

(a first surface of the connector body 10) from which the optical waveguide 30 is inserted into the connector body 10. There is a slit bottom 14 where the optical waveguide slit 13 ends.

A bottom surface 15 of the insertion slit 12 is a plane approximately perpendicularly intersecting with the insertion surface 29 of the connector body 10. A top surface 17 of the insertion slit 12 forms a first angle with the bottom surface 15, and approaches the bottom surface 15 as the top surface 17 extends further into the insertion slit 12. In other words, the insertion slit 12 has a one-sided tapered structure at the first angle.

A bottom surface 16 of the optical waveguide slit 13 is a plane approximately perpendicularly intersecting with the insertion surface of the connector body 10. A top surface 18 of the optical waveguide slit 13 forms a second angle with the bottom surface 16, and approaches the bottom surface 16 as the top surface 18 extends further into the optical waveguide slit 13. In other words, the optical waveguide slit 13 has a one-sided tapered structure at the second angle. The bottom surface 15 of the insertion slit 12 and the bottom surface 16 of the optical waveguide slit 13 form one continuous plane. The first angle may be the same as or larger than the second angle. Setting the first angle larger than the second angle makes it easier to insert the optical waveguide 30 into the optical waveguide slit 13.

A wall-like pressing part 21 is provided so as to rise from the top surface 18 of the optical waveguide slit 13. The pressing part 21 extends in the depth direction of the optical waveguide slit 13, starting from near the center in the depth direction of the optical waveguide slit 13 and ending short of the slit bottom 14. A point on the top surface of the pressing part 21 closest to the bottom surface 16 of the optical waveguide slit 13 (that is, the closest point) is separated from the bottom surface 16 by a separation distance smaller than the thickness of the optical waveguide 30.

Specifically, the connector body 10 has three such pressing parts 21, that is, pressing parts 21-1, 21-2, and 21-3. The pressing part 21-1 is provided along a right side surface 19 of the optical waveguide slit 13 when viewed from the insertion surface of the connector body 10. The pressing part 21-2 is provided approximately in the center of the optical waveguide slit 13, that is, near the center in the width direction of the optical waveguide slit 13. The pressing part 21-3 is provided along a left side surface 20 of the optical waveguide slit 13 in a position separated from the left side surface 20 by a first distance. The pressing parts 21-1, 21-2, and 21-3 may be made of an elastic material.

A projection 22 is provided on the left side surface 20 of the optical waveguide slit 13 near the entrance of the optical waveguide slit 13. The projection 22 forms a wall having a side surface that starts from near the entrance of the optical waveguide slit 13 and rises from the left side surface 20 so as to form a gentle convex arc toward the inside of the optical waveguide slit 13. The side surface of the projection 22 is connected at both ends thereof to the top surface 18 and the bottom surface 16 of the optical waveguide slit 13. A separation distance D1 between a point on the side surface of the projection 22 located most inside the optical waveguide slit 13 and the left side surface 20 (that is, the innermost point) is equal to or slightly smaller than the first distance. A separation distance D2 between the innermost point of the projection 22 and the right side surface 19 of the optical waveguide slit 13 is equal to or slightly smaller than the width of the optical waveguide 30. The projection 22 may be made of an elastic material.

A receptacle 26 is provided on a second surface that is on the side opposite to the first surface of the connector body 10, that is, on a connecting surface 25 for a facing connector body (not illustrated) that is paired with the connector body 10. On the bottom of the receptacle 26, a plurality of micro-lenses 27 are provided in a line so that the center of each of the micro-lenses 27 is aligned along a "virtual reference plane". The virtual reference plane is parallel to the bottom surface 16 of the optical waveguide slit 13, and is separated from the bottom surface 16 by a separation distance D3.

On the connecting surface 25 of the connector body 10, a pair of receptacles 28-1 and 28-2 are provided. Protrusions are provided on the connecting surface of the facing connector body (not illustrated) paired with the connector body 10, and are inserted into the receptacles 28-1 and 28-2. While the connecting surface of the connector body 10 is kept in contact with the connecting surface of the facing connector body (not illustrated) paired with the connector body 10, the connector body 10 is connected to the facing connector body.

Figure 5:
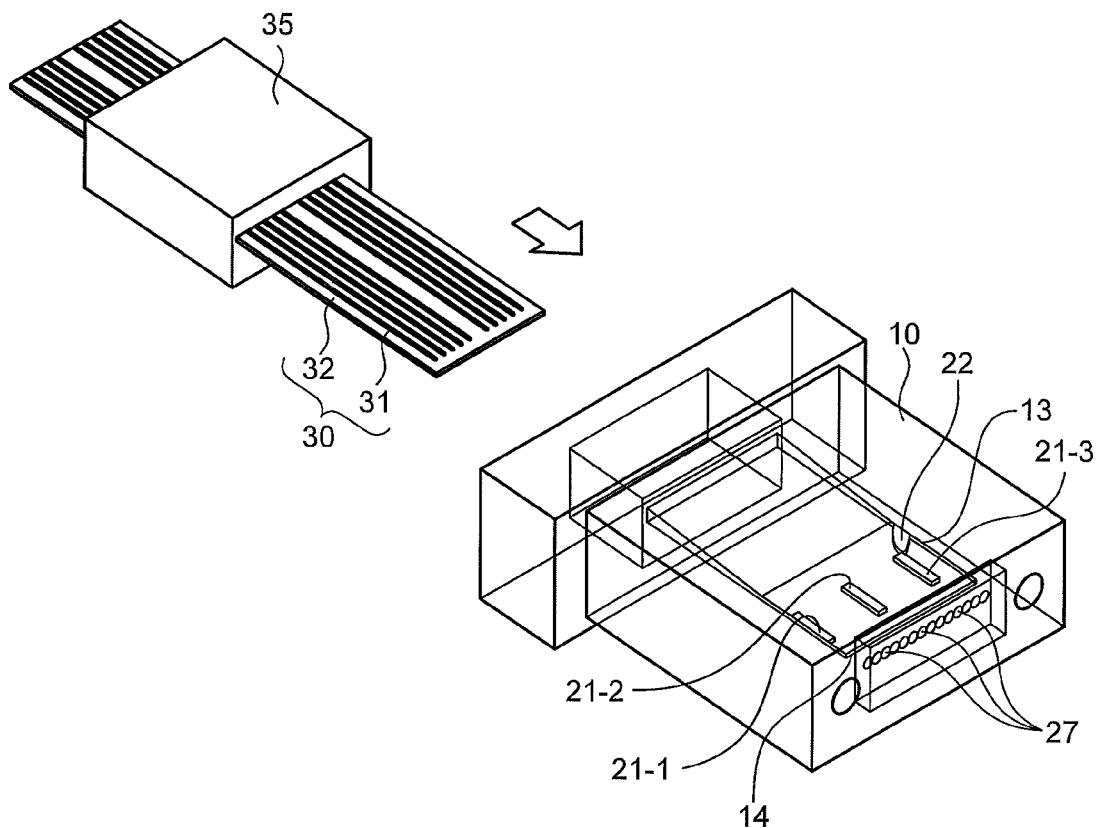
FIG. 5 is another schematic for explaining the assembling of the optical connector having an optical waveguide.
Figure 6:
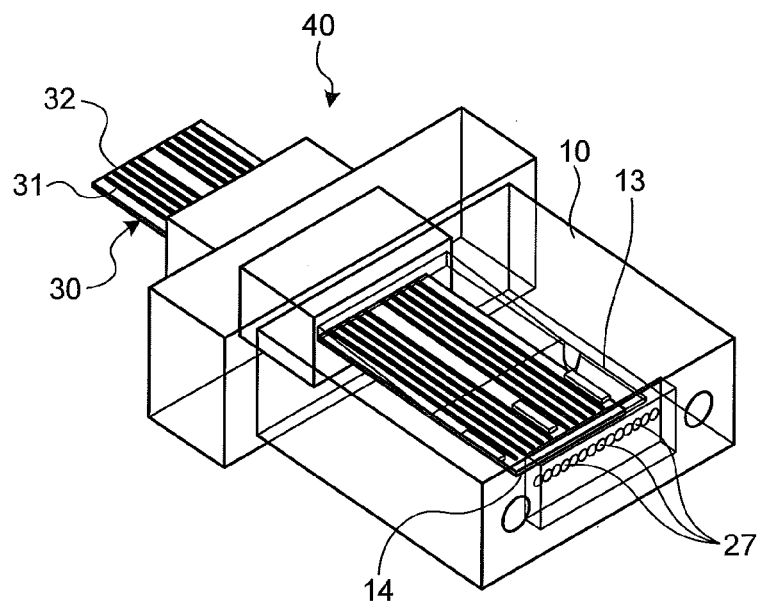
FIG. 6 is another schematic for explaining the assembling of the optical connector having the optical waveguide.

The optical waveguide 30 is inserted into the optical waveguide slit 13 inside of the connector body 10. FIGS. 5 and 6 are schematics for explaining assembling of an optical connector 40 having the optical waveguide 30.

The optical waveguide 30 includes a plurality of cores 31 and a cladding 32 that covers the outer circumference of the cores 31. Adhesive (not illustrated) is applied at the tip of the optical waveguide 30, and the optical waveguide 30 is placed between a rubber boot 35. The tip of the optical waveguide 30 is then inserted into the optical waveguide slit 13. Because the cladding 32 has a smaller refractive index than the core 31, the light input to one end of the core 31 is transmitted by repeating total reflections in the core 31, and output to the other end of the core 31.

As illustrated in FIG. 6, complete insertion of the optical waveguide 30 into the connector body 10 presses the tip of the optical waveguide 30 against the slit bottom 14 of the optical waveguide slit 13. In this state, the adhesive is cured by radiation of heat or ultraviolet (UV) rays, and thus, the optical waveguide 30 is fixed to the connector body 10.

Figure 7:
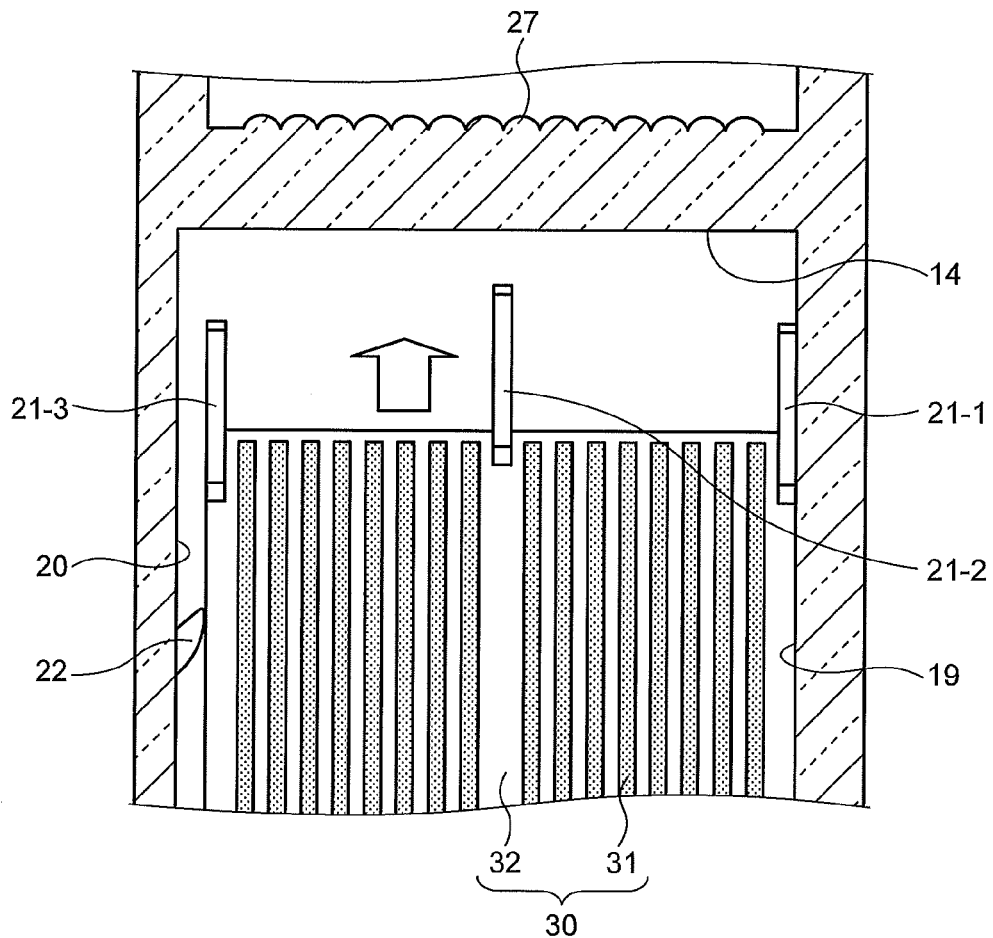
FIG. 7 is a schematic for functional explanation of pressing parts and a projection of the optical connector according to the embodiment.
Figure 8:
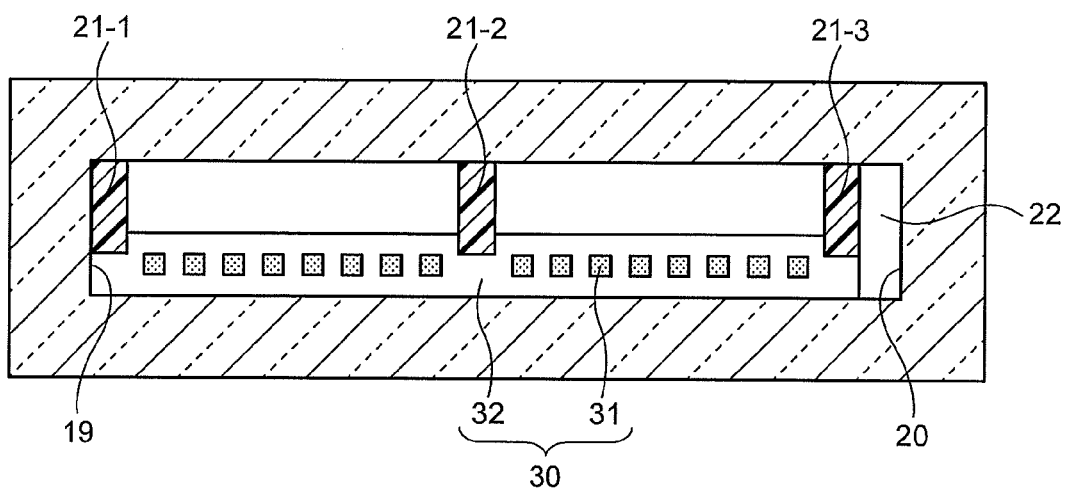
FIG. 8 is another schematic for the functional explanation of the pressing parts and the projection of the optical connector according to the embodiment.

Functions of the pressing parts 21 and the projection 22 will now be explained. FIGS. 7 and 8 are schematics for the functional explanation of the pressing parts and the projection.

As illustrated in FIG. 7, the optical waveguide 30 is gradually inserted into the optical waveguide slit 13, from the insertion slit 12 toward the slit bottom 14. As the left corner of the tip of the optical waveguide 30 contacts the side surface of the projection 22, the side surface guides the whole optical waveguide 30 toward the right side surface 19. As described above, the separation distance D2 between the innermost point of the projection 22 and the right side surface 19 of the optical waveguide slit 13 is equal to or slightly smaller than the width of the optical waveguide 30. This causes the optical waveguide 30 to be held in a state in which the right side surface of the optical waveguide 30 is brought into contact with or weakly pressed against the right side surface 19. In other words, the projection 22 has a function of bringing the right side surface of the optical waveguide 30 into contact with the right side surface 19.

In this state, the optical waveguide 30 is further inserted into the optical waveguide slit 13, and the tip of the optical waveguide 30 is inserted under the pressing parts 21. As described above, the separation distance between the closest point of the pressing parts 21 and the bottom surface 16 is smaller than the thickness of the optical waveguide 30. This allows the pressing parts 21, as illustrated in FIG. 8, to press the optical waveguide 30 inserted in the optical waveguide slit 13, and maintain the state in which the bottom surface of the optical waveguide 30 abuts against the bottom surface 16. As illustrated in FIG. 8, the pressing parts 21 are provided in positions corresponding to positions not provided with the cores 31 of the optical waveguide 30 enclosed in the optical waveguide slit 13 (that is, portions provided only with the cladding 32). In other words, the pressing parts 21 press the positions not provided with the cores 31 of the optical waveguide 30 enclosed in the optical waveguide slit 13. This can prevent degradation in transmission quality of optical signals resulting from pressing of the optical waveguide 30 by the pressing parts 21. The optical waveguide 30 is deformed by being pressed by the pressing parts 21.

The distance between the bottom surface of the optical waveguide 30 and the centers of the cores 31 is equal to the separation distance D3 between the virtual reference plane and the bottom surface 16 of the optical waveguide slit 13. The distances between the right side surface of the optical waveguide 30 and the centers of the respective cores 31 are equal to the distances from the right side surface of the optical waveguide 30 to the centers of the respective micro-lenses 27. As a result, the centers of the cores 31 can accurately be aligned with the centers of the micro-lenses 27 by maintaining the state in which the pressing parts 21 and the projection 22 brings the bottom surface and the right side surface of the optical waveguide 30 into contact with the bottom surface 16 and the right side surface 19, respectively, of the optical waveguide slit 13. In other words, the pressing parts 21 and the projection 22 can accurately align the centers of the cores 31 with the centers of the micro-lenses 27 simply by accurately aligning two reference planes of the optical waveguide 30 and the optical waveguide slit 13 with each other.

Exemplary Structure of Optical Module

Figure 9:
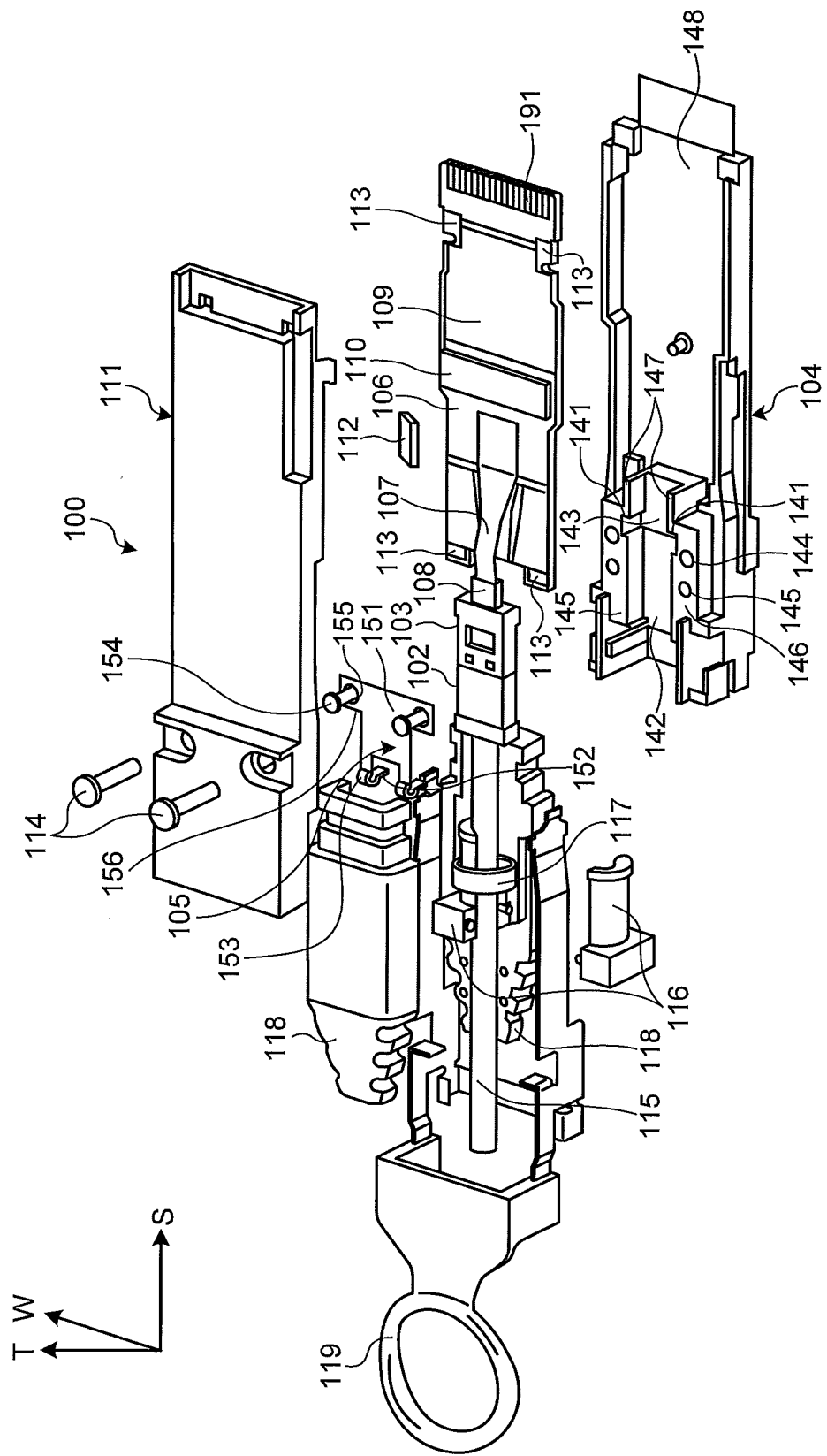
FIG. 9 is a schematic of an example of an optical module including the optical connector according to the embodiment.

An example of an optical module including the optical connector will now be explained. FIG. 9 is a schematic of an example of an optical module including the optical connector according to the embodiment.

As illustrated in FIG. 9, this optical module 100 includes a mechanically transferable (MT) ferrule 102 and a lens ferrule 103 that is aligned with the MT ferrule 102 via alignment pins. The lens ferrule 103 corresponds to the connector body 10. The optical module 100 also includes a lower cover 104 having a support 141 for supporting the lens ferrule 103 from the side of a connecting direction S, and a ferrule clip 105 fastened to the lower cover 104 to press the MT ferrule 102 against the lens ferrule 103. The support 141 is a wall facing the opposite direction of the connecting direction S.

In FIG. 9, "S" represents the direction in which the MT ferrule 102 is connected to the lens ferrule 103, "T" represents a thickness direction of the plate-like lower cover 104 of the optical module 100 in a direction from the bottom toward the opening, and "W" represents a width direction that is perpendicular to the connecting direction S and the thickness direction T. In FIG. 9, for the illustrative purpose, the arrow representing the thickness direction T is illustrated to point upwardly, and the arrow representing the width direction W is illustrated to point to the left with respect to the connecting direction S. Only the connecting direction S, and not the thickness direction T and the width direction W, has directionality.

The MT ferrule 102 has an almost cuboid shape, and has an extended portion extended in the width direction W and the thickness direction T on the side opposite to the connecting direction S. The lens ferrule 103 also has an almost cuboid shape, and has an extended portion extended in the width direction W and the thickness direction T on the side of the connecting direction S. The support 141 on the lower cover 104 supports the right end surface of the extended portion of the lens ferrule 103.

The ferrule clip 105 includes a plate-like portion 151 fastened to the lower cover 104, a pair of abutting portions 152 abutting against the left end surface of the MT ferrule 102, a pair of springs 153 connecting the abutting portions 152 to the plate-like portion 151 and giving a biasing force to the abutting portions 152 toward the MT ferrule 102. An example of the material of the ferrule clip 105 includes a flexible metal. The ferrule clip 105 also includes screws 154 to be tightened to the lower cover 104, and threaded holes 155 in which the screws 154 are passed. The plate-like portion 151 has a pair of tabs 156 correspondingly to the threaded holes 155.

The lower cover 104 has a U-shaped cutout 142 in which the MT ferrule 102 and the lens ferrule 103 are fitted and aligned. On the side nearer to the support 141 than the cutout 142, an enclosure 143 that accommodates the extended portion of the lens ferrule 103 is provided. The enclosure 143 is wider in the width direction W and deeper in the thickness direction T than the cutout 142. The lower cover 104 also has a block portion 146 having a pair of female screws 144 corresponding to screws 114 on an upper cover 111, and a pair of female screws 145 corresponding to the screws 154 on the ferrule clip 105, at positions outside of the cutout 142 in the width direction W. The female screws 144 are positioned nearer to the support 141 than the female screws 145. A pair of enclosure walls 147 that accommodates a ferrule boot 108 therebetween is provided nearer to the connecting direction S than the support 141. The ferrule boot 108 corresponds to the rubber boot 35.

The optical module 100 includes an optical waveguide 107 extending from the lens ferrule 103 toward an optical engine 106, and a ferrule boot 108 for keeping the optical waveguide 107 bent. The optical waveguide 107 corresponds to the optical waveguide 30. Because the ferrule boot 108 is positioned at a shorter distance to the optical engine 106 than the length of the optical waveguide 107, the optical waveguide 107 is kept bent.

The optical module 100 also includes a printed board 109, and an electrical connector 110 implemented at a predetermined position on the printed board 109, and the optical engine 106 is connected to the electrical connector 110 and positioned on the printed board 109. An edge connector 191 is implemented on the right edge of the printed board 109.

The optical module 100 includes the upper cover 111 for covering the opening of the lower cover 104, and a thermal conducting sheet 112 conducting the heat produced by the optical engine 106 to the upper cover 111 to release the heat.

In the printed board 109, the area from where the electrical connector 110 is implemented to where the card edge connector 191 is placed is wider than the area where the optical engine 106 is implemented in the width direction W. The printed board 109 is housed in a board enclosure 148 positioned nearer to the connecting direction S than the enclosure walls 147 of the lower cover 104.

An optical fiber 115 extends from the MT ferrule 102, on the side opposite to the connecting direction S. The optical fiber 115 is passed through a pair of sleeves 116 and a fastening ring 117, and fitted in a pair of cable boots 118. A pull-tab/latch 119 is attached to the cable boot 118.

To fill the gap formed between the printed board 109 and the upper cover 111, synthetic resin members 113 are positioned at predetermined positions of the printed board 109.

As described above, according to the embodiment, the optical connector 40 includes the optical waveguide slit 13 and the pressing parts 21. The optical waveguide slit 13 is a hole extending from the insertion surface (that is the first surface) of the connector body 10 into the connector body 10. The optical waveguide slit 13 accommodates the sheet-like optical waveguide 30 whose tip abuts against the slit bottom 14. The pressing parts 21 are provided on the top surface 18 of the optical waveguide slit 13. The pressing parts 21 press the optical waveguide 30 enclosed in the optical waveguide slit 13 toward the bottom surface 16 of the optical waveguide slit 13, and thus maintain the state in which the bottom surface of the optical waveguide 30 abuts against the bottom surface 16 of the optical waveguide slit 13.

This structure of the optical connector 40 allows the centers of the cores 31 to be easily aligned with the centers of the micro-lenses 27 simply by making the distance between the bottom surface of the optical waveguide 30 and the centers of the cores 31 equal to the separation distance D3 between the virtual reference plane of the micro-lenses 27 and the bottom surface 16 of the optical waveguide slit 13. This results in prevention of reduction in the optical transmission efficiency while preventing a reduction in the yield rate.

In the optical connector 40, the pressing parts 21 press the positions not provided with the cores 31 of the optical waveguide 30 enclosed in the optical waveguide slit 13.

This structure of the optical connector 40 can prevent the degradation in the transmission quality of optical signals resulting from pressing of the optical waveguide 30 by the pressing parts 21. The pressing parts 21 may press positions provided with the cores 31. This case only requires the cores 31 pressed by the pressing parts 21 not to be used for transmitting optical signals. In other words, the pressing parts 21 may press the cores 31 in the optical waveguide 30 enclosed in the optical waveguide slit 13 that are not used for transmitting optical signals. This structure of the optical connector 40 can also prevent the degradation in the transmission quality of optical signals resulting from pressing of the optical waveguide 30 by the pressing parts 21.

The optical connector 40 has the projection 22. The projection 22 is provided on the left side surface 20 of the optical waveguide slit 13, and maintains the state in which the optical waveguide 30 abuts against the right side surface 19 by pushing the optical waveguide 30 toward the right side surface 19.

This structure of the optical connector 40 allows the centers of the cores 31 to be easily aligned with the centers of the micro-lenses 27 simply by making the distances between the right side surface of the optical waveguide 30 and the centers of the respective cores 31 equal to the distances from the right side surface 19 of the optical waveguide 30 to the centers of the respective micro-lenses 27. This results in the prevention of the reduction in the optical transmission efficiency while preventing the reduction in the yield rate. While this example provides the projection 22 on the left side surface 20 of the optical waveguide slit 13, the projection 22 may be provided on the right side surface 19 of the optical waveguide slit 13.

At least one of the pressing parts 21 and the projection 22 is elastic. This can inhibit the degradation in the transmission quality of optical signals resulting from pressing of the optical waveguide 30 by the pressing parts 21 and/or the projection 22.

According to one aspect of the present invention, an optical connector capable of preventing an optical transmission efficiency reduction can be achieved.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical connector comprising:
   a connector body;
   an enclosure that is a slit-shaped hole formed from one surface of the connector body into the connector body, and accommodates a sheet-like optical waveguide with a tip of the optical waveguide abutting against a bottom of the hole;
   a pressing section that is provided on a first surface of the enclosure facing a sheet surface of the enclosed optical waveguide, and presses the enclosed optical waveguide toward a second surface of the enclosure facing the first surface so as to bring the enclosed optical waveguide into contact with the second surface; and
   a plurality of micro-lenses provided on a second surface of the connector body opposite to the bottom of the hole, and aligned along a plane parallel to the second surface of the enclosure.

2. The optical connector according to claim 1, wherein the pressing section presses a position at the enclosed optical waveguide in which no core is provided, or a position at the enclosed optical waveguide in which a core not used for transmitting optical signals is provided.

3. The optical connector according to claim 1, further comprising a projection that is provided on a third surface of the enclosure located between the first surface and the second surface, and pushes the enclosed optical waveguide toward a fourth surface facing the third surface so as to bring the enclosed optical waveguide into contact with the fourth surface.

4. The optical connector according to claim 3, wherein at least one of the pressing section and the projection is elastic.

5. The optical connector according to claim 1, wherein the optical waveguide is deformed by being pressed by the pressing section.

6. The optical connector according to claim 2, further comprising a projection that is provided on a third surface of the enclosure located between the first surface and the second surface, and pushes the enclosed optical waveguide toward a fourth surface facing the third surface so as to bring the enclosed optical waveguide into contact with the fourth surface.

7. The optical connector according to claim 6, wherein at least one of the pressing section and the projection is elastic.

* * * * *